Patented Apr. 27, 1937

2,078,472

UNITED STATES PATENT OFFICE 2,078,472

LUBRICATING OIL

Charles C. Towne, Poughkeepsie, N. Y., assignor to The Texas Company, New York, N. Y., a corporation of Delaware No Drawing. Application August 3, 1934,
Serial No. 738,294

8 Claims. (Cl. 87—9)

This invention relates to the manufacture of lubricating oils, and particularly to mineral lubricating oils of improved character having an increased viscosity index.

In the production of high grade lubricating oils, it is well known that a relatively small change in the viscosity of the oil between temperatures of say 100° F. and 210° F., is desirable. In other words, it is advantageous for the oil to have a relatively flat viscosity-temperature curve, which means that the oil has a high viscosity index as defined by Dean and Davis in their article in Chemical and Metallurgical Engineering, vol. 36, page 618. Improvement in lubricating oils has heretofore been accomplished by chemical or solvent refining as by the use of sulphuric acid or selective solvents. The latter process is effective in extracting or separating naphthenic constituents from paraffinic constituents, thereby producing a resulting raffinate of increased viscosity index. This procedure involves expensive processing, and results in a reduced yield of finished oil.

The advantage of low pour point of a lubricating oil has long been recognized. Paraffin base and Mid-Continent lubricating oils have been subjected to dewaxing in order to reduce the pour point thereof. However, substantially complete removal of wax from such oils results in a lowering in viscosity index.

The present invention relates to the increase in viscosity index of naphthene base or paraffin base lubricating oils, by the addition thereto of a small proportion of a material which is active to increase the viscosity index without objectionably affecting other desirable properties thereof. More particularly, the present invention relates to the production of an improved lubricating oil of this type having an increased viscosity index, by the addition thereto of a controlled proportion of synthetic resin which is the reaction product of rubber with certain amphoteric metallic halides or halogen acids.

The particular type of resin contemplated herein is that produced when anhydrous solutions of rubber are treated with halide salts of amphoteric metals possessing residual or so-called secondary valences, such as stannic chloride or bromide, and boron trichloride, and the like, or when solid rubber is worked on a rubber mill with the same compounds, as described in U. S. patent to Bruson, No. 1,846,247; or when boron fluoride or fluorboric acid, produced as the reaction product of hydrofluoric acid with boric acid or metal salts of boric acid, are added directly to rubber and worked on a rubber mill at elevated temperatures to yield thermoplastic, moldable conversion products, or when the reaction product is added to a solution of rubber in benzene or other rubber solvent, as described in U. S. patent to Bruson, No. 1,853,334; or when halogenated acids of tin, such as chlorostannic acid or chlorostannous acid or the corresponding brom-acids, are reacted with rubber, as by addition of approximately 10% of the reagent to rubber on a rubber mill, or to a solution of rubber in benzene or other rubber solvent, as described in U. S. patent to Bruson, No. 1,797,118. Specifically, the moldable thermoplastic resin which is now commercialized by the Goodyear Tire and Rubber Company under the trade name "Plioform" constitutes a very satisfactory material of this character. This resin varies in character from a balata-like substance to an exceedingly hard material resembling ebonite depending upon the reagents and proportions thereof employed. The characteristics of resins of this character are described by Theis and Clifford in J. I. E. C. 26, 123. The products contain a certain amount of bound chlorine or halogen, depending upon the temperature and the proportions of the ingredients. They are soluble in benzene or other rubber solvents. They are softened upon the application of heat and may be molded. Typical properties of the resin have been determined as follows:

| | |
|---|---|
| Specific gravity | 1.06 |
| Odor | None |
| Taste | None |
| Softening point, °F.— | |
| No. 20 Plioform | 220 |
| No. 40 Plioform | 175–195 |
| Molding temp., °F.— | |
| No. 20 Plioform | 310 |
| No. 40 Plioform | 260 |
| Coefficient of thermal expansion | 0.00008 |
| Resistance to discoloration by light | Good |
| Surface resistivity (ohms per linear in.)— | |
| At 90% relative humidity | $1 \times 10^{11}$ |
| At 75% relative humidity | $1 \times 10^{12}$ |
| Tensile strength, lb./sq. in. | 4000–5000 |
| Compressive strength, lb./sq. in. | 8500–11000 |
| Flexural strength, lb./sq. in. | 7000–9000 |
| Water absorption (24-hr. immersion), % | 0.03 |
| Resistance to concd. acid | Good |
| Resistance to strong alkali | Good |

In accordance with the present invention, a resin comprising the reaction product of rubber and an amphoteric metallic halide or halogen acid of the character specified above, is added in a minor proportion to a mineral lubricating oil. For example, to increase the viscosity index, the resin may be added in proportions of from 0.5-5% by weight. The resin may first be dissolved in a suitable solvent, such as benzol, the solution added to the mineral lubricating oil in an amount required to give the desired proportions of dissolved resin, and then the solvent removed by distillation, or the resin may be dissolved directly in oil at 70° to 90° C. with vigorous agitation.

The following examples are listed to illustrate the effect of the addition of the above described resin in increasing viscosity index of typical naphthene base and Mid-Continent lubricating oils, some of which had been solvent refined as by treatment with furfural. In each instance, the resin was dissolved in benzol, the solution added to the oil in a proportion to give the desired resin content, and the solvent removed from the oil by distillation.

|  | Say. univ. vis. °F. | | |
|---|---|---|---|
|  | 100 | 210 | V. I. |
| No. 1 naphthene base oil | 216 | 43 | 0 |
| No. 1+1% resin | 303 | 49.5 | 64 |
| No. 1+2% resin | 425 | 56 | 74.5 |
| No. 2 naphthene base oil | 307 | 47 | 20 |
| No. 2+1% resin | 450 | 55 | 57 |
| No. 2+2% resin | 580 | 61 | 64.5 |
| No. 3 naphthene base oil | 530 | 52 | 0 |
| No. 3+1% resin | 776 | 64 | 40 |
| No. 3+2% resin | 1098 | 76 | 50 |
| Mid-Continent oil SAE #10 | 243 | 46.5 | 59 |
| Mid-Continent oil SAE #10+1% resin | 343 | 53 | 81.5 |
| Mid-Continent oil SAE #10+2% resin | 463 | 60.5 | 91 |
| Mid-Continent oil SAE #20 | 356 | 51.5 | 60.5 |
| Mid-Continent oil SAE #20+1% resin | 495 | 60 | 80.5 |
| Mid-Continent oil SAE #20+2% resin | 683 | 70 | 85.5 |
| Mid-Continent oil SAE #30 | 611 | 60 | 50.5 |
| Mid-Continent oil SAE #30+1% resin | 868 | 73 | 69 |
| Mid-Continent oil SAE #30+2% resin | 1180 | 88 | 77 |
| Furfural refined Mid-Continent oil SAE #10 | 170 | 44 | 84 |
| Furfural refined Mid-Continent oil SAE #10+1% resin | 228 | 49.5 | 108 |
| Furfural refined Mid-Continent oil SAE #10+2% resin | 300 | 55.5 | 114.5 |
| Furfural refined Mid-Continent oil SAE #20 | 341 | 53.5 | 86.5 |
| Furfural refined Mid-Continent oil SAE #20+1% resin | 464 | 61.5 | 95 |
| Furfural refined Mid-Continent oil SAE #20+2% resin | 618 | 72.5 | 103 |
| Furfural refined Mid-Continent oil SAE #30 | 553 | 63 | 82 |
| Furfural refined Mid-Continent oil SAE #30+1% resin | 750 | 75 | 91 |
| Furfural refined Mid-Continent oil SAE #30+2% resin | 996 | 88 | 93 |

The following data indicate that by the addition of resin of this character to a lubricating oil, a low viscosity at 0° F. can be achieved without sacrificing the desired viscosity at 210° F.:

|  | 100 | 210 | V.I. | Saybolt universal extrapolated viscosity ASTM chart at 0° F. | Experimentally determined Saybolt furol viscosity at 0° F. |
|---|---|---|---|---|---|
| Furfural refined Mid-Continent oil | 270 | 49.5 | 83.5 | 25,000 | 2,200 |
| Furfural refined Mid-Continent oil of lower viscosity than above, plus 1.25% Plioform | 245 | 50 | 103 | 16,000 | 1,450 |

The carbon residue of lubricating oils to which the present resin has been added, is not objectionably increased, as is evident from the following Conradson carbon test:

Conradson carbon
Furfural refined SAE #10 oil _____ 0.01
Furfural refined SAE #10 oil + 1% resin ___ 0.07
Furfural refined SAE #10 oil + 2% resin ___ 0.11
Furfural refined SAE #10 oil + 3% resin ___ 0.16

The addition of resins of the character described above to partially dewaxed paraffin base or mixed base lubricating oils is also found advantageous in reducing the pour point thereof, in addition to increasing the viscosity index. This enables a paraffin base or mixed base lubricating oil to be prepared by partially dewaxing so as to normally have a pour point of from about 15° to 40° F. without material reduction in the normal viscosity index; and then by the addition of a small proportion of the resin of the present invention, the pour point may be lowered to about 0° to 10° F. or below while at the same time further increasing the viscosity index.

By way of example of reduction in pour point of a partially dewaxed paraffin base oil normally having a pour point of around 20° F., the following results were obtained by the addition to 100 cc. of the oil of the amounts of the above described resin as specified below:

Pour point, °F.
0.25 g. resin _____ 10
.50 g. resin _____ 10
1.00 g. resin _____ 5

Valuable lubricating oils of the character of rocker arm lubricant and similar improved lubricants can be produced by the addition of somewhat higher percentages of resin of the present invention to lubricating oils. For example, the addition of about 5-40% by weight of the resin to a mineral lubricating oil is found to give a highly effective lubricant of this character. The following viscosity tests were obtained on lubricating oils containing higher proportions of the resin of the present invention:

|  | Saybolt univ. vis., °F. | |
|---|---|---|
|  | 100° F. | 210° F. |
| Furfural refined Mid-Continent oil SAE No. 20 | 341 | 53.5 |
| Same plus 10% resin | 594* | 353 |
| Same plus 20% resin | 6132* | 275* |
| Same plus 30% resin |  | 1780* |

*Saybolt furol viscosities.

Naphthene base oil—70 Saybolt univ. vis. at 100° F.
Same plus 25% resin showed these tests:

Saybolt furol viscosity
At 100° F. _____ 4,807 seconds
At 210° F. _____ 203,205 seconds The above data indicate the high solubility of the resin in oil and the extremely high viscosity which can be attained by the use thereof. The viscosity index of such compositions is high, thus enabling such compositions to be used where high viscosity and high viscosity index are required as in gear lubricants, for example.

Where the expression "partially dewaxed paraffin base oil" is used in the description and claims, it is to be understood that this refers to an oil of the mixed base or Mid-Continent type as well as an oil of the paraffin base or Pennsylvania type, unless the contrary appears from the text.

Obviously many modifications and variations of the invention, as hereinbefore set forth, may be made without departing from the spirit and scope thereof, and therefore only such limitations should be imposed as are indicated in the appended claims.

I claim:

1. A lubricating oil of improved character comprising a petroleum lubricating oil admixed with a minor proportion of a synthetic resinous product consisting essentially of a reaction product of rubber with a compound selected from the group consisting of halides of tin and boron, and halogen acids of tin and boron.

2. A lubricating oil of relatively higher viscosity index comprising a petroleum lubricating oil of relatively lower viscosity index admixed with about 0.5–5% by weight of a synthetic resin consisting essentially of a reaction product of rubber with one of a group of amphoteric metal halides and halogen acids consisting of stannic chloride, stannic bromide, boron trichloride, boron fluoride, fluoboric acid, chlorostannic acid, chlorostannous acid, bromostannic acid and bromostannous acid.

3. The method in the manufacture of a lubricating oil of improved character, which comprises preparing a reaction product of rubber with one of a group of compounds consisting of halides and halogen acids of tin and boron to form a resinous material, and adding the resinous material in a minor proportion to a petroleum lubricating oil.

4. The method in the manufacture of a lubricating oil of improved character, which comprises preparing a reaction product of rubber with one of a group of compounds consisting of halides and halogen acids of tin and boron to form a resin, dissolving the resin in a solvent, adding the resinous solution to a mineral lubricating oil in a quantity to provide a minor proportion of the resin therein, and removing the solvent from the oil.

5. The method in the manufacture of a lubricating oil of improved character, which comprises preparing a reaction product of rubber with one of a group of compounds consisting of halides and halogen acids of tin and boron, and dissolving the reaction product in a minor proportion in a petroleum lubricating oil by agitating therein at an elevated temperature.

6. A lubricating oil of improved character comprising a petroleum lubricating oil admixed with about 0.5–40% by weight of a synthetic resinous product consisting essentially of a reaction product of rubber with stannic chloride.

7. The method in the manufacture of a lubricating oil of improved character, which comprises reacting rubber with one of a group of compounds consisting of halides and halogen acids of tin and boron to produce a synthetic resinous reaction product, separating an oil soluble polymer from the resinous reaction product, and dissolving the oil soluble polymer in a minor proportion in a petroleum lubricating oil.

8. The method in the manufacture of lubricating oil of improved character which comprises reacting rubber with stannic chloride to produce a resinous reaction product, separating an oil soluble polymer from the resinous reaction product, and dissolving the oil soluble polymer in a minor proportion in a petroleum lubricating oil.

CHARLES C. TOWNE.